United States Patent
Kim et al.

(10) Patent No.: US 10,642,965 B2
(45) Date of Patent: May 5, 2020

(54) METHOD AND SYSTEM FOR IDENTIFYING OPEN-SOURCE SOFTWARE PACKAGE BASED ON BINARY FILES

(71) Applicant: INSIGNARY INC., Seoul (KR)

(72) Inventors: Younggon Kim, Anyang-si (KR); Tae-Jin Kang, Seoul (KR); Si Haeng Cho, Seoul (KR)

(73) Assignee: INSIGNARY INC., Seoul (KR)

( * ) Notice: Subject to any disclaimer, the term of this patent is extended or adjusted under 35 U.S.C. 154(b) by 203 days.

(21) Appl. No.: 15/858,119

(22) Filed: Dec. 29, 2017

(65) Prior Publication Data

US 2019/0087550 A1 Mar. 21, 2019

(30) Foreign Application Priority Data

Sep. 15, 2017 (KR) .................. 10-2017-0118840

(51) Int. Cl.
| | |
|---|---|
| *G06F 21/10* | (2013.01) |
| *G06F 8/60* | (2018.01) |
| *G06F 8/71* | (2018.01) |
| *G06F 16/14* | (2019.01) |

(52) U.S. Cl.
CPC .............. *G06F 21/105* (2013.01); *G06F 8/60* (2013.01); *G06F 8/71* (2013.01); *G06F 16/148* (2019.01); *G06F 2221/0773* (2013.01)

(58) Field of Classification Search
CPC ........ G06F 21/105; G06F 16/148; G06F 8/60; G06F 8/71; G06F 2221/0773
See application file for complete search history.

(56) References Cited

U.S. PATENT DOCUMENTS

| | | | |
|---|---|---|---|
| 9,304,980 B1 | 4/2016 | Hartsook et al. | |
| 9,965,639 B2* | 5/2018 | Bhat | G06F 21/6209 |
| 10,108,786 B2* | 10/2018 | Quinzin | G06F 21/10 |

(Continued)

FOREIGN PATENT DOCUMENTS

| | | |
|---|---|---|
| KR | 20140050323 | 4/2014 |
| KR | 20150051508 | 5/2015 |

OTHER PUBLICATIONS

International Search Report—PCT/KR2018/007936 dated Oct. 12, 2018.

(Continued)

*Primary Examiner* — J. Brant Murphy
*Assistant Examiner* — Stephen T Gundry
(74) *Attorney, Agent, or Firm* — Cantor Colburn LLP (57) ABSTRACT

Provided are a method and system for identifying an open-source software package from a binary file for which an open-source license is to be checked. The method includes: accessing a database generated to include a plurality of open-source software packages having a plurality of open-source files and open-source software package version information, based on a plurality of first identifiers included in each of the plurality of open-source files; receiving the binary file; extracting at least one second identifier included in the binary file by performing a string search on the binary file; and extracting at least one first identifier that matches the at least one second identifier from the database, and outputting an open-source software package and open-source software package version information corresponding to the at least one first identifier.

24 Claims, 6 Drawing Sheets

(56) References Cited

U.S. PATENT DOCUMENTS

| | | | |
|---|---|---|---|
| 2004/0172367 A1* | 9/2004 | Chavez | G06F 21/105 |
| | | | 705/59 |
| 2006/0026567 A1* | 2/2006 | McVoy | G06F 16/213 |
| | | | 717/120 |
| 2007/0100820 A1* | 5/2007 | Block | G06F 8/71 |
| 2012/0054733 A1* | 3/2012 | Vidal | G06F 8/61 |
| | | | 717/171 |
| 2013/0212160 A1* | 8/2013 | Lawson | G05B 19/4185 |
| | | | 709/203 |
| 2013/0347118 A1* | 12/2013 | Yi | G06F 21/10 |
| | | | 726/26 |
| 2014/0115720 A1* | 4/2014 | Yi | G06F 21/105 |
| | | | 726/27 |
| 2014/0229484 A1* | 8/2014 | Kataoka | G06F 16/148 |
| | | | 707/737 |
| 2015/0143328 A1* | 5/2015 | Cope | G06Q 10/063 |
| | | | 717/102 |
| 2015/0169321 A1* | 6/2015 | Rissell | G06F 8/71 |
| | | | 717/121 |
| 2016/0124966 A1* | 5/2016 | Cohen | G06F 16/24578 |
| | | | 707/723 |
| 2016/0127398 A1* | 5/2016 | Cohen | G06F 16/24578 |
| | | | 726/23 |
| 2016/0202972 A1 | 7/2016 | Sass et al. | |
| 2016/0335275 A1* | 11/2016 | Williams | H04W 64/00 |
| 2018/0129812 A1* | 5/2018 | Kang | G06F 21/566 |
| 2018/0373507 A1* | 12/2018 | Mizrahi | G06N 7/00 |
| 2019/0005206 A1* | 1/2019 | Sahoo | G06F 21/105 |
| 2019/0065709 A1* | 2/2019 | Salomon | H04L 9/006 |
| 2019/0087550 A1* | 3/2019 | Kim | G06F 8/60 |
| 2019/0182053 A1* | 6/2019 | Varpiola | G06Q 50/184 |

OTHER PUBLICATIONS

Korean Office Action—Korean Application No. 10-2017-0118840 dated Jan. 8, 2019, citing KR 10-2014-0050323 and US 2012/0054733.

* cited by examiner

| COLUMN | EXPLANATION |
|---|---|
| FIRST IDENTIFIER | FIRST IDENTIFIER EXTRACTED FROM OPEN-SOURCE FILE |
| PACKAGE | OPEN-SOURCE SOFTWARE PACKAGE NAME |
| FILE NAME | OPEN-SOURCE FILE NAME IN WHICH FIRST IDENTIFIER EXISTS |

| COLUMN | EXPLANATION |
| --- | --- |
| PACKAGE | OPEN-SOURCE SOFTWARE PACKAGE NAME |
| VERSION | OPEN-SOURCE SOFTWARE PACKAGE VERSION INFORMATION |
| PATH NAME | OPEN-SOURCE FILE PATH |
| CHECKSUM | CHECKSUM FOR OPEN-SOURCE FILE |
| FILE NAME | OPEN-SOURCE FILE NAME |

| COLUMN | EXPLANATION |
| --- | --- |
| FIRST IDENTIFIER | FIRST IDENTIFIER EXTRACTED FROM OPEN-SOURCE FILE |
| CHECKSUM | CHECKSUM FOR OPEN-SOURCE FILE |
| LOCATION | LOCATION IN WHICH FIRST IDENTIFIER EXISTS IN OPEN-SOURCE FILE |

| FIRST IDENTIFIER | OPEN-SOURCE SOFTWARE PACKAGE | OPEN-SOURCE FILE |
|---|---|---|
| "AAA" | PACKAGE A | FILE a |
| "BBB" | PACKAGE A | FILE b |
|  | PACKAGE B | FILE c |
| "CCC" | PACKAGE A | FILE d |
|  | PACKAGE B | FILE d |
|  | PACKAGE C | FILE d |

FIG. 6B

| FIRST IDENTIFIER | OPEN-SOURCE SOFTWARE PACKAGE | OPEN-SOURCE FILE | WEIGHT |
|---|---|---|---|
| "AAA" | PACKAGE A | FILE a | 20 |
| "BBB" | PACKAGE A | FILE b | 10 |
|  | PACKAGE B | FILE c | 10 |
| "CCC" | PACKAGE A | FILE d | 20 |
|  | PACKAGE B | FILE d | 0 |
|  | PACKAGE C | FILE d | 0 |

FIG. 7

| FIRST IDENTIFIER | OPEN-SOURCE FILE NAME | CHECKSUM | VERSION | LOCATION | WEIGHT |
|---|---|---|---|---|---|
| AAA | FILE a | FIRST CHECKSUM | 1.0.1 | FIRST LOCATION | 1 |
| | | | 1.0.2 | FIRST LOCATION | 1 |
| | | | 1.1.0 | SECOND LOCATION | 1 |
| BBB | FILE b | FOURTH CHECKSUM | 1.0.1 | FOURTH LOCATION | 1 |
| | | | 1.0.2 | FOURTH LOCATION | 1 |
| | | | 1.1.0 | – | 0 |
| CCC | FILE d | SIXTH CHECKSUM | 1.0.1 | FIFTH LOCATION | 1 |
| | | | 1.1.0 | FIFTH LOCATION | 1 |

METHOD AND SYSTEM FOR IDENTIFYING OPEN-SOURCE SOFTWARE PACKAGE BASED ON BINARY FILES

CROSS-REFERENCE TO RELATED APPLICATIONS

The present application claims priority from Korean Patent Application No. 10-2017-0118840 filed on Sep. 15, 2017, the entire subject matter of which is incorporated herein by reference.

TECHNICAL FIELD

The present disclosure relates to a method and system for identifying an open-source software package based on binary files.

BACKGROUND ART

The term "open source" refers to software or a software license that allows a third party to view the source code of the software while maintaining the rights of the original author of the corresponding software or hardware. Generally, in the development of software or hardware for specific purposes, the use of open-source allows joint participation, rapid prototyping, transparency in an exchange of opinions, and community development. Thus, developers and businesses can quickly and stably produce software or hardware having desired functionalities by utilizing a variety of open-source.

Like commercial software, open-source software is also subject to copyright (licensing). However, open-source software differs from commercial software in the manner in which copyright is exercised. General open-source software copyright owners can open source code (an open-source file) and exercise their rights to allow viewing, copying, installation, use, modification, and redistribution of the source code.

However, since the open-source software can be easily searched and downloaded to be used by anyone via the Internet, the use of open-source software in violation of the copyrights of copyright owners of the corresponding software has been increasing. Because of this, technology is used to determine whether particular software has used the source code of the open-source software, or to verify license of the open-source software.

SUMMARY

License verification of the open-source software may be required not only for source code, but also for other types of code (e.g., machine code, object code, and binary code/file) generated using the source code.

For example, a binary file refers to a file generated in a form that can be directly executed by a computer or a processor by compiling a file in the form of source code. However, it is difficult for ordinary users or programmers to easily understand or identify a binary file that has been converted from the source code to a different type of code. Thus, it is difficult to verify the license that was granted to the original source code. As a result, there has been inconvenience in having to verify the license of the corresponding open-source software through the source code used to generate the binary file.

The present disclosure aims to solve difficulties in verifying licenses for other types of code converted from the source code of open-source software, as described above. In order to solve such problems, a method and system are provided for identifying an open-source software package and open-source software package version information corresponding to a binary file based on an identifier included in each of a plurality of open-source files and an identifier included in the binary file.

According to one aspect of the present disclosure, there is provided a method for identifying an open-source software package from a binary file for which an open-source license is to be checked. The method may include: accessing a database generated to include a plurality of open-source software packages having a plurality of open-source files and open-source software package version information, based on a plurality of first identifiers included in each of the plurality of open-source files; receiving the binary file; extracting at least one second identifier included in the binary file by performing a string search on the binary file; and extracting at least one first identifier that matches the at least one second identifier from the database, and outputting an open-source software package and open-source software package version information corresponding to the at least one first identifier.

In an embodiment, each of the first identifier and the second identifier may include a string that is preserved even after the open-source files are compiled.

In an embodiment, accessing the database may include: downloading the plurality of open-source software packages from an open-source providing server; extracting open-source information from the plurality of open-source software packages; and generating the database based on the open-source information.

In an embodiment, the open-source information may include the plurality of first identifiers, an open-source software package name, open-source software package version information, and an open-source file name.

In an embodiment, the database may include: a first database storing a first table, the first table including the first identifiers corresponding to each of the plurality of open-source software packages, the open-source software package names, and the open-source file names in which the first identifiers exist; a second database storing a second table, the second table including the open-source software package names corresponding to the plurality of open-source files, the open-source software package version information, the open-source file names, and open-source file checksums; and a third database storing a third table, the third table including the open-source file checksums corresponding to the first identifiers and location information of the first identifiers in the open-source files.

In an embodiment, extracting the at least one second identifier included in the binary file may include: identifying a file type of the binary file; and extracting the at least one second identifier from the binary file according to the file type.

In an embodiment, the database may further include a reference open-source software package name of a reference open-source software package designated by a manager among the plurality of open-source software packages, and a reference first identifier that is identically included in the reference open-source software package of a plurality of pieces of open-source software package version information.

In an embodiment, outputting the open-source software package and the open-source software package version information corresponding to the at least one first identifier may include: extracting at least one open-source software package name and at least one open-source file name corresponding to the at least one first identifier; assigning a weight to the at least one open-source software package name based on the at least one open-source software package name and the at least one open-source file name; and detecting an open-source software package name having the highest weight from the at least one open-source software package name to which the weight is assigned.

In an embodiment, extracting the at least one open-source software package name and the at least one open-source file name corresponding to the at least one first identifier may include detecting an open-source software package name that matches the reference open-source software package name among the extracted at least one open-source software package name based on the reference first identifier.

In an embodiment, detecting the open-source software package name that matches the reference open-source software package name may include: identifying a first identifier that matches the reference first identifier among the at least one first identifier; and treating an open-source software package name corresponding to the matched first identifier as the reference open-source software package name.

In an embodiment, extracting the at least one open-source software package name and the at least one open-source file name corresponding to the at least one first identifier may include: extracting two consecutive first identifiers in an order in which the at least one first identifier is identified; determining whether an open-source software package name corresponding to the initially identified first identifier among the two consecutive first identifiers is a unique open-source software package name; if the open-source software package name corresponding to the initially identified first identifier is determined to be the unique open-source software package name, determining whether an open-source software package name that matches the unique open-source software package name exists among the open-source software package names corresponding to the finally identified first identifier among the two consecutive first identifiers; and if the open-source software package name matching the unique open-source software package name is determined to exist, replacing the matched open-source software package name with the unique open-source software package name.

In an embodiment, outputting the open-source software package and the open-source software package version information corresponding to the at least one first identifier may include: extracting, from the second database, at least one open-source file checksum corresponding to at least one open-source file name included in the detected open-source software package name, and at least one piece of open-source software package version information corresponding to the at least one open-source file checksum; and detecting open-source software package version information corresponding to the detected open-source software package name based on the at least one first identifier and the at least one open-source file checksum.

In an embodiment, detecting the open-source software package version information corresponding to the detected open-source software package name based on the at least one first identifier and the at least one open-source file checksum may include: determining whether location information corresponding to the at least one first identifier for the at least one open-source file checksum exists in the third database; if the location information corresponding to the at least one first identifier is determined to exist, assigning a predetermined weight to open-source software package version information corresponding to the at least one open-source file checksum; and detecting open-source software package version information having the highest weight among the open-source software package version information as open-source software package version information corresponding to the detected open-source software package name.

According to another aspect of the present disclosure, there is provided a system for identifying an open-source software package from a binary file for which an open-source license is to be checked. The system may include: a storage unit storing a database generated to include a plurality of open-source software packages having a plurality of open-source files and open-source software package version information, based on a plurality of first identifiers included in each of the plurality of open-source files; a reception unit configured to receive the binary file; a processor configured to extract at least one second identifier included in the binary file by performing a string search on the binary file, to extract at least one first identifier that matches the at least one second identifier from the database, and to detect an open-source software package and open-source software package version information corresponding to the at least one first identifier; and an output unit configured to output the detected open-source software package and open-source software package version information.

In an embodiment, each of the first identifier and the second identifier may include a string that is preserved even after the open-source file is compiled.

In an embodiment, the processor may be configured to: download the plurality of open-source software packages from an open-source providing server through the reception unit; extract open-source information from the plurality of open-source software packages; and generate the database based on the open-source information.

In an embodiment, the open-source information may include the plurality of first identifiers, an open-source software package name, open-source software package version information, and an open-source file name.

In an embodiment, the database may include: a first database storing a first table, the first table including the first identifiers corresponding to each of the plurality of open-source software packages, the open-source software package names, and the open-source file names in which the first identifiers exist; a second database storing a second table, the second table including the open-source software package names corresponding to the plurality of open-source files, the open-source software package version information, the open-source file names, and open-source file checksums; and a third database storing a third table, the third table including the open-source file checksums corresponding to the first identifiers and location information of the first identifiers in the open-source files.

In an embodiment, the processor may be configured to: identify a file type of the binary file; and extract the at least one second identifier from the binary file according to the file type.

In an embodiment, the database may further include: a reference open-source software package name of a reference open-source software package designated by a manager among the plurality of open-source software packages; and a reference first identifier that is identically included in the reference open-source software package of the plurality of pieces of open-source software package version information.

In an embodiment, the processor may be configured to: extract at least one open-source software package name and at least one open-source file name corresponding to the at least one first identifier; assign a weight to the at least one open-source software package name based on the at least one open-source software package name and the at least one open-source file name; and detect the open-source software package name having the highest weight from the at least one open-source software package name to which the weight is assigned.

In an embodiment, the processor may be configured to detect an open-source software package name that matches the reference open-source software package name among the extracted at least one open-source software package name based on the reference first identifier.

In an embodiment, the processor may be configured to: identify a first identifier that matches the reference first identifier among the at least one first identifier; and treat an open-source software package name corresponding to the matched first identifier as the reference open-source software package name.

In an embodiment, the processor may be configured to: extract two consecutive first identifiers in an order in which the at least one first identifier is identified; determine whether an open-source software package name corresponding to the initially identified first identifier among the two consecutive first identifiers is a unique open-source software package name or not; if the open-source software package name corresponding to the initially identified first identifier is determined to be the unique open-source software package name, determine whether an open-source software package name that matches the unique open-source software package name exists among the open-source software package names corresponding to the finally identified first identifier among the two consecutive first identifiers; and if the open-source software package name matching the unique open-source software package name is determined to exist, replace the matched open-source software package name with the unique open-source software package name.

In an embodiment, the processor may be configured to: extract, from the second database, at least one open-source file checksum corresponding to at least one open-source file name included in the detected open-source software package name, and at least one piece of open-source software package version information corresponding to the at least one open-source file checksum; and detect open-source software package version information corresponding to the detected open-source software package name based on the at least one first identifier and the at least one open-source file checksum.

In an embodiment, the processor may be configured to: determine whether location information corresponding to the at least one first identifier for the at least one open-source file checksum exists in the third database; if the location information corresponding to the at least one first identifier is determined to exist, assign a predetermined weight to open-source software package version information corresponding to the at least one open-source file checksum; and detect open-source software package version information having the highest weight among the open-source software package version information as open-source software package version information corresponding to the detected open-source software package name.

According to various embodiments of the present disclosure, even after a binary file is generated by compiling a source code file of open-source software, an open-source software package and open-source software package version information used in the binary file can be identified based on an identifier preserved in the binary file.

In addition, based on the identified open-source software package and open-source software package version information, license information of the open-source software corresponding to the binary file can be provided.

DETAILED DESCRIPTION

Embodiments of the present disclosure are illustrated for describing the technical concepts of the present disclosure. The scope of the claims according to the present disclosure is not limited to the embodiments described below or to detailed descriptions of these embodiments.

All technical or scientific terms used herein have meanings that are generally understood by a person having ordinary knowledge in the art to which the present disclosure pertains, unless otherwise specified. The terms used herein are selected to more clearly illustrate the present disclosure, and are not intended to limit the scope of claims in accordance with the present disclosure.

The expressions "include," "provided with," "have," and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applied to a singular expression stated in the claims.

The terms "first," "second," etc. used herein are used to distinguish a plurality of components from one another, and are not intended to limit the order or importance of the relevant components.

The term "unit" used herein means a software component or hardware component, such as a field-programmable gate array (FPGA) and an application specific integrated circuit (ASIC). However, a "unit" is not limited to software and hardware, and may be configured to be an addressable storage medium or may be configured to run on one or more processors. Accordingly, as an example, a "unit" may include components, such as software components, object-oriented software components, class components, and task components, as well as processors, functions, attributes, procedures, subroutines, segments of program codes, drivers, firmware, micro-codes, circuits, data, databases, data structures, tables, arrays, and variables. Functions provided in components and "unit" may be combined into a smaller number of components and "units" or further subdivided into additional components and "units."

The expression "based on" used herein is used to describe one or more factors that influence a decision, an action of judgment or an operation described in a phrase or sentence including the relevant expression, and this expression does not exclude an additional factor influencing the decision, the action of judgment or the operation.

When a certain component is described as "coupled to" or "connected to" another component, this should be understood as meaning that the certain component may be coupled or connected directly to the other component or that the certain component may be coupled or connected to the other component via a new intervening component.

In the present disclosure, the term "open source" refers to software or a software license that allows a third party to view the source code of the software while maintaining the rights of the original author of the corresponding software or hardware. In describing various embodiments of the present disclosure, the terms "open source," "open-source software" and "open-source software package" may be used interchangeably in the same or similar sense. In addition, in the present disclosure, the term "open-source file" (or open-source code file) refers to a file including computer program source code written in an arbitrary programming language and the use of which is governed by an open-source license. The term "open-source software package" (or open source package) refers to a software package or product constituted of one or more open-source files.

Hereinafter, embodiments of the present disclosure will be described with reference to the accompanying drawings. In the accompanying drawings, like or corresponding components are indicated by like reference numerals. In the following description of embodiments, repeated descriptions of identical or corresponding components may be omitted. However, even if a description of a component is omitted, such a component is not intended to be excluded in an embodiment.

Figure 1:
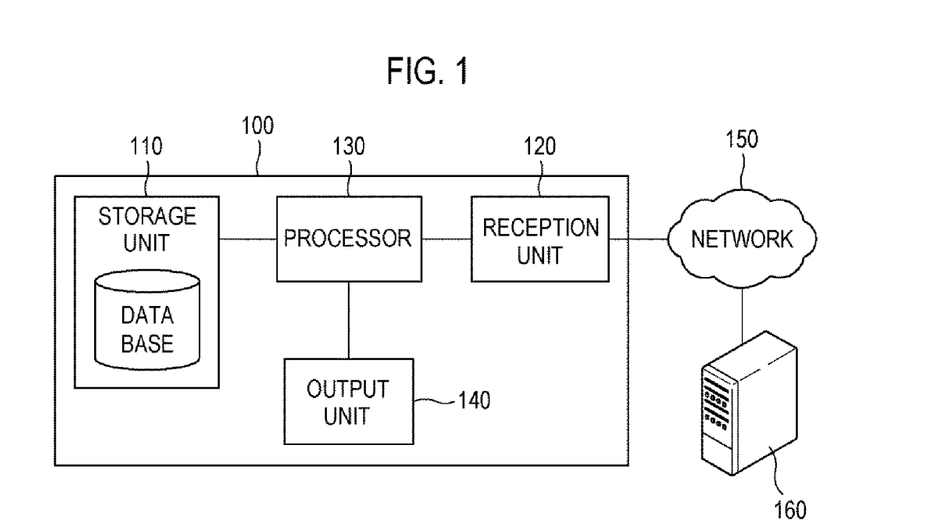
FIG. 1 is a block diagram schematically illustrating the configuration of an open-source identification system according to an embodiment of the present disclosure.

FIG. 1 is a block diagram schematically illustrating a configuration of an open-source identification system according to an embodiment of the present disclosure. Referring to FIG. 1, an open-source identification system 100 includes a storage unit 110, a reception unit 120, a processor 130, and an output unit 140.

The storage unit 110 stores a database including a plurality of open-source software packages and open-source software package version information. The plurality of open-source software packages may have a plurality of open-source files. Further, the plurality of open-source software packages may be generated based on a plurality of first identifiers. The plurality of first identifiers may be included in each of the plurality of open-source files. In addition, the storage unit 110 may store open-source license information corresponding to each of the plurality of open-source software packages and the open-source software package version information.

In an embodiment, the open-source software packages may be provided from an open-source providing server 160. The open-source providing server may be connected to the open-source identification system 100 via a network 150. For example, the network 150 may include both a wired network and a wireless network. The wired network may include the Internet, a dedicated line, and the like. Further, the wireless network may include a wireless Internet, a mobile communication network, a satellite communication network, and the like. In addition, the open-source providing server 160 includes a server providing Linux-kernel open-source software packages (for example, Linux-kernel open-source software (https://www.kernel.org)), a server providing OpenSSL open-source software packages (for example, GitHub (https://github.com/openssl/openssl)), and the like.

In the present disclosure, an "identifier" of open-source or open-source software (or an open-source software package) may refer to information or data that can uniquely identify a license or license version granted to the corresponding open-source or the like. Here, the information or data indicative of an identifier of the open-source or the like may be one or more arbitrary strings included in the corresponding open-source or the like. However, it may not be limited thereto.

In an embodiment, a first identifier may be a string included in an open-source file. The string can be preserved so as to be identifiable even after the open-source file (or source code) has been compiled and changed to another type of code, such as a binary file. In one example, the first identifier may include a string representing a function name, a variable, a symbol, or the like.

In an embodiment, the database may be generated based on open-source information which is extracted from the plurality of open-source software packages. For example, the open-source information may include the first identifier, an open-source software package name, open-source software package version information and an open-source file name. In addition, the open-source information may further include a checksum of the open-source file, location information of the first identifier in the open-source file, and an open-source file path name indicative of a path of the open-source file.

In the above-described embodiment, it is described that the checksum corresponding to a redundant check of the open-source file is stored in the database, in order to reduce the amount of information stored in the database. However, in another embodiment, the open-source file may be stored in the database.

In an embodiment, the database stored in the storage unit 110 may store an open-source software package name of an open-source software package and a first identifier. The open-source software package (hereinafter, referred to as a "reference open-source software package") may be designated as the original by a manager. Also, the first identifier (hereinafter, referred to as a "reference first identifier") may be included in all version information of the reference open-source software package, among a plurality of first identifiers included in the reference open-source software package.

Figure 2A:
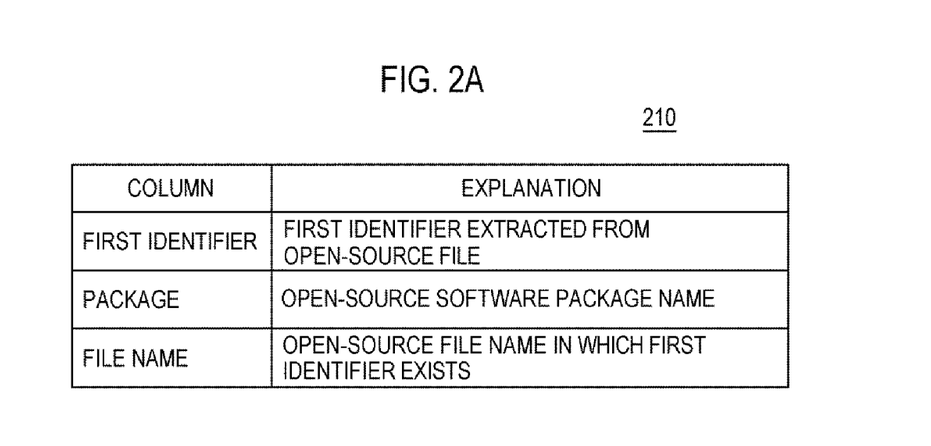
FIGS. 2A to 2C illustrate databases according to an embodiment of the present disclosure.
Figure 2B:
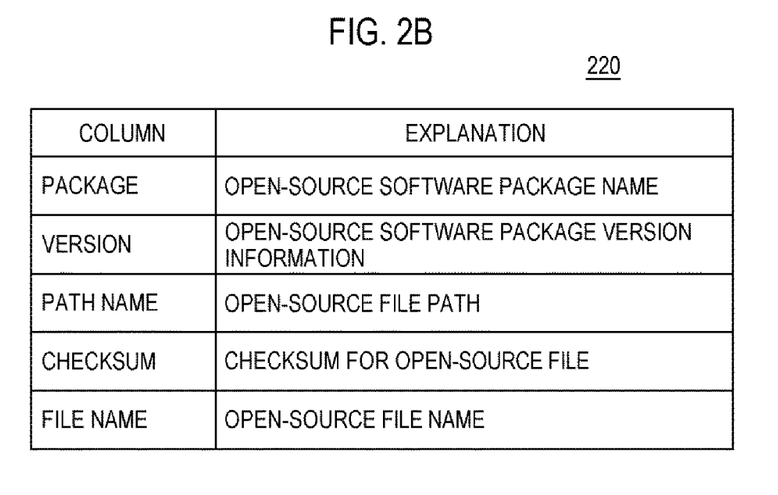
Figure 2C:
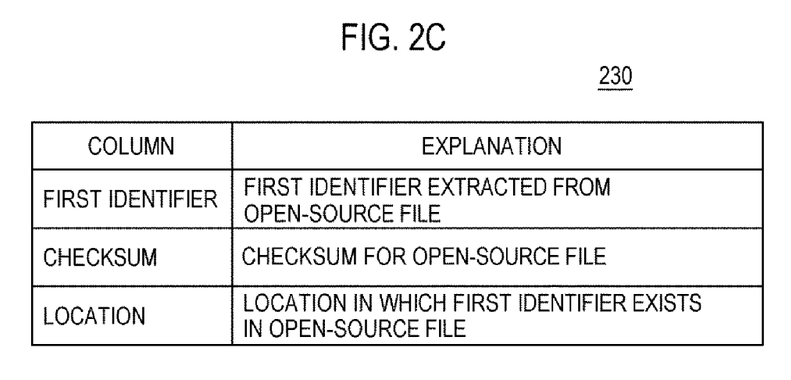

FIGS. 2A to 2C illustrate databases according to an embodiment of the present disclosure. In an embodiment, as illustrated in FIG. 2A, the database may include a first database storing a first table 210. The first table 210 may include: first identifiers corresponding to each of a plurality of open-source software packages; open-source software package names; and open-source file names in which the first identifiers exist. In addition, as illustrated in FIG. 2B, the database may include a second database storing a second table 220. The second table 220 may include: open-source software package names corresponding to a plurality of open-source files; open-source software package version information; open-source file names; open-source file path names; and checksums of the open-source files. Further, as illustrated in FIG. 2C, the database may include a third database storing a third table 230. The third table 230 may include: the first identifiers; checksums of the open-source files corresponding to the first identifiers; and location information of the first identifiers in the open-source files.

In an embodiment, the storage unit 110 may include a first storage unit (not shown) for storing the first database, a second storage unit (not shown) for storing the second database, and a third storage unit (not shown) for storing the third database. In another embodiment, the first database, the second database, and the third database may be stored in one storage unit 110.

In an embodiment, the storage unit 110 may include a magnetic disk (e.g., magnetic tape, flexible disk, and hard disk), an optical disk (e.g., CD, DVD, etc.), a semiconductor memory (e.g., RAM, ROM, flash memory, USB or SD card including a flash memory, etc.), and the like, but may not be limited thereto.

The reception unit 120 receives a binary file for which an open-source license is to be checked. In an embodiment, the reception unit 120 may connect to an external server (e.g., the server 160) that provides the binary file. Further, reception unit 120 may download the binary file from the external server. In another embodiment, the reception unit 120 may connect to an external storage medium (not shown) in which the binary file is stored. Further, reception unit 120 may download the binary file from the external storage medium.

The processor 130 receives the binary file from the reception unit 120. Further, the processor extracts at least one second identifier from the received binary file. In an embodiment, the second identifier may be a string included in an open-source file. The string is preserved even after the open-source file is compiled and changed to another type of code. That is, the string is not changed even when the open-source file is compiled. Further, the processor 130 extracts at least one first identifier, which matches the at least one second identifier, from the database stored in the storage unit 110. In addition, the processor 130 detects an open-source software package and open-source software package version information corresponding to the extracted at least one first identifier. In addition, the processor 130 may detect open-source license information corresponding to the identified open-source software package and open-source software package version information. Furthermore, the processor 130 may control operations of the storage unit 110, the reception unit 120 and the output unit 140.

In an embodiment, the processor 130 may be a processor capable of executing the above-described processing, control operations, or program instructions for executing such operations. The processor 130 may include any one of a central processing unit (CPU), a field-programmable gate array (FPGA), an application-specific integrated circuit (ASIC), a graphic processing unit (GPU), an application processor (AP), and the like. However, it may not be limited thereto.

The output unit 140 outputs the open-source software package and the open-source software package version information detected by the processor 130. In addition, the output unit 140 may output the open-source license information detected by the processor 130.

In an embodiment, the output unit 140 may include a display and a speaker. The display may visually display the open-source software package, the open-source software package version information, the open-source license information or the like. The speaker may output such information acoustically, and the like. However, it may not be limited thereto.

Figure 3:
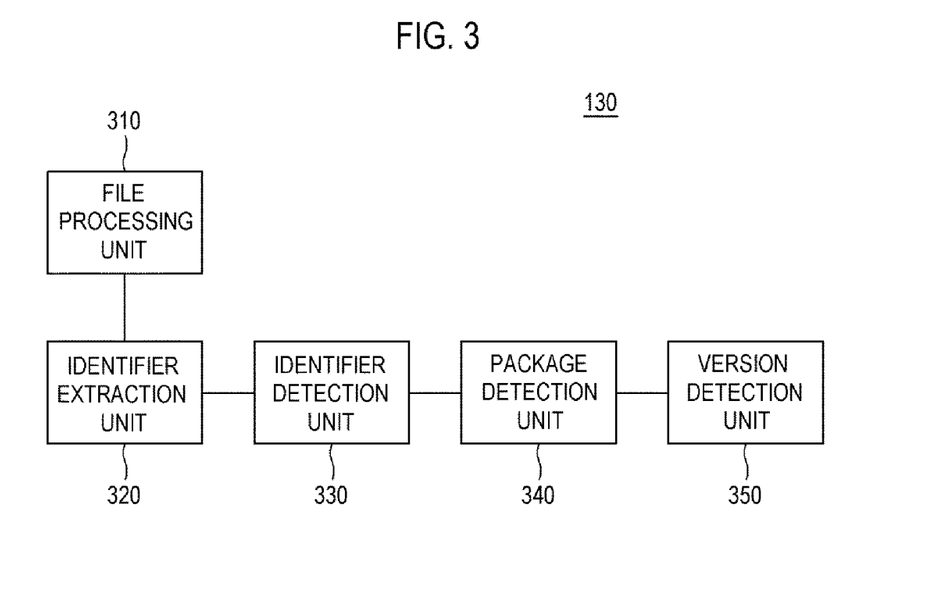
FIG. 3 is a block diagram schematically illustrating the configuration of a processor according to an embodiment of the present disclosure.

FIG. 3 is a block diagram schematically illustrating the configuration of the processor according to an embodiment of the present disclosure. Referring to FIG. 3, the processor 130 includes a file processing unit 310, an identifier extraction unit 320, an identifier detection unit 330, a package detection unit 340, and a version detection unit 350.

The file processing unit 310 is connected to the reception unit 120. The file processing unit 310 receives a binary file from the reception unit 120. In addition, the file processing unit 310 analyzes the file type of the received binary file. When it is determined that the binary file is a compressed binary file by analyzing the file type, the file processing unit 310 performs decompression processing on the binary file.

The identifier extraction unit 320 is connected to the file processing unit 310. The identifier extraction unit 320 receives the binary file from the file processing unit 310. In addition, the identifier extraction unit 320 extracts at least one second identifier from the received binary file. In an embodiment, the second identifier may include a string. The string may be preserved even after an open-source file is compiled. That is, the string may be not changed even when the open-source file is compiled. In addition, the second identifier may include a string indicating a function name, a variable, a symbol, or the like.

The identifier detection unit 330 is connected to the identifier extraction unit 320. The identifier detection unit 330 receives the at least one second identifier from the identifier extraction unit 320. Further, the identifier detection unit 330 detects at least one first identifier, which matches the at least one second identifier, from the database (for example, the first database) stored in the storage unit 110. In addition, the identifier detection unit 330 detects an open-source software package name and an open-source file name that include the at least one first identifier.

The package detection unit 340 is connected to the identifier detection unit 330. The package detection unit 340 receives at least one open-source software package name and open-source file name from the identifier detection unit 330. Further, the package detection unit 340 assigns a weight to the at least one open-source software package name, based on the received at least one open-source software package name and open-source file name. In addition, the package detection unit 340 detects the open-source software package name having the highest weight among the at least one open-source software package name to which the weight is assigned. That is, the package detection unit 340 may detect the open-source software package name having the highest weight, and may determine the detected open-source software package name as an open-source software package name that matches the binary file.

In one embodiment, the package detection unit 340 may detect the open-source software package name corresponding to the original open-source software package among the received at least one open-source software package name, based on the reference first identifier stored in the database. For example, the package detection unit 340 determines whether a first identifier, which matches the reference first identifier, exists among the at least one first identifier detected by the identifier detection unit 330 based on the database stored in the storage unit 110. If a first identifier, which matches the reference first identifier, is determined to exist, the package detection unit 340 may detect the open-source software package name corresponding to the matched first identifier as the original open-source software package name. Further, package detection unit 340 may treat (replace) the detected original open-source software package name as the reference open-source software package name.

In an embodiment, when a unique open-source software package name corresponding to any one first identifier among a plurality of first identifiers that match the second identifier has been detected immediately beforehand, a plurality of open-source software package names corresponding to the next first identifier is detected, and the unique open-source software package name is included in the plurality of open-source software package names, the package detection unit 340 may replace the open-source software package name corresponding to the next first identifier with the unique open-source software package name.

For example, when the first identifiers that match the second identifier are "AAA" and "BBB", the open-source software package name corresponding to the first identifier "AAA" is uniquely detected as "package A," and the open-source software package names corresponding to the next first identifier "BBB" are "package A" and "package B," the package detection unit 340 replaces the open-source software package name corresponding to the first identifier "BBB" with the open-source software package name "package A."

The version detection unit 350 is connected to the package detection unit 340. The version detection unit 350 receives the open-source software package name having the highest weight, which is detected by the package detection unit 340. In addition, from the database stored in the storage unit 110, the version detection unit 350 extracts at least one piece of open-source software package version information and open-source file name corresponding to the open-source software package name having the highest weight, along with at least one checksum corresponding to the open-source file name. Further, the version detection unit 350 detects the open-source software package version information corresponding to the open-source software package name having the highest weight, based on the at least one first identifier and the at least one checksum. Through such a detection process, the version detection unit 350 detects the open-source software package version information that matches the binary file.

Additionally or alternatively, the processor 130 may further include a database generation unit (not shown). The database generation unit may download a plurality of open-source software packages from the open-source providing server 160 through the reception unit 120. Further, the database generation unit may generate the database based on the plurality of downloaded open-source software packages.

Figure 4:
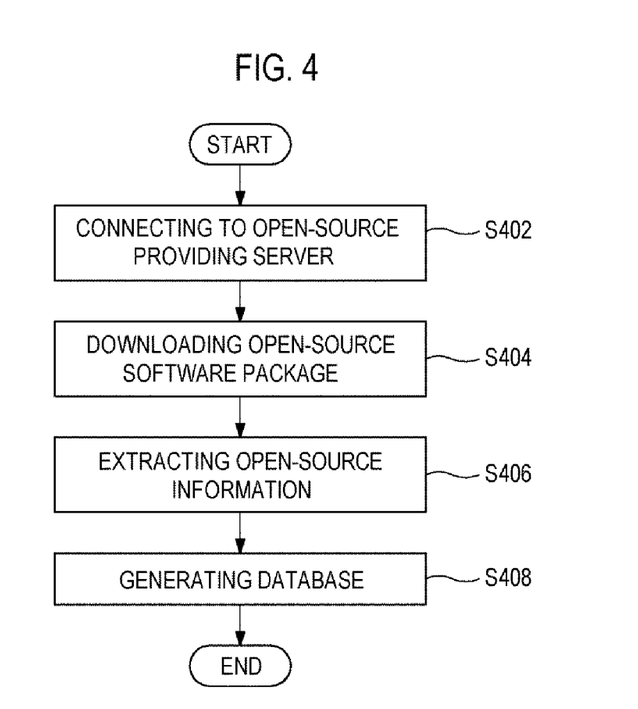
FIG. 4 is a flowchart illustrating a method of generating a database according to an embodiment of the present disclosure.

FIG. 4 is a flowchart illustrating a method of generating a database according to an embodiment of the present disclosure. Although process steps, method steps, algorithms, etc. are illustrated in a sequential order in the flowchart shown in FIG. 4, such processes, methods, and algorithms may be configured to be operated in any suitable order. In other words, the steps in the processes, methods, and algorithms explained in various embodiments of the present disclosure are not necessarily performed in the order described in the present disclosure. Further, even though some steps are explained as being performed non-simultaneously, such steps may be simultaneously performed in another embodiment. Moreover, the illustration of the processes depicted in the figure does not mean that the illustrated processes exclude other changes and modifications thereto, that any of the illustrated processes or the steps thereof is essential for at least one of various embodiments of the present disclosure, and that the illustrated processes are desirable.

Referring to FIG. 4, in step S402, the open-source identification system 100 is connected to the open-source providing server. In step S404, a plurality of open-source software packages is downloaded from the open-source providing server. For example, the processor 130 is connected to the open-source providing server 160 through the reception unit 120. Further, the processor 130 downloads the plurality of open-source software packages from the connected open-source providing server 160.

In step S406, open-source information is extracted from each of the plurality of open-source software packages. For example, the processor 130 extracts the open-source information from the plurality of open-source software packages. In an embodiment, the open-source information may include the first identifiers, the open-source software package names, the open-source software package version information and the open-source file names. Additionally, the open-source information may further include the checksums of the open-source files, the location information of the first identifiers in the open-source files, and the open-source file path names. The open-source file path names indicate the path of the open-source files.

In step S408, a database is generated based on the open-source information. For example, the processor 130 generates the database as shown in FIGS. 2A to 2C, based on the open-source information. The generated database may be stored in the storage unit 110.

Figure 5:
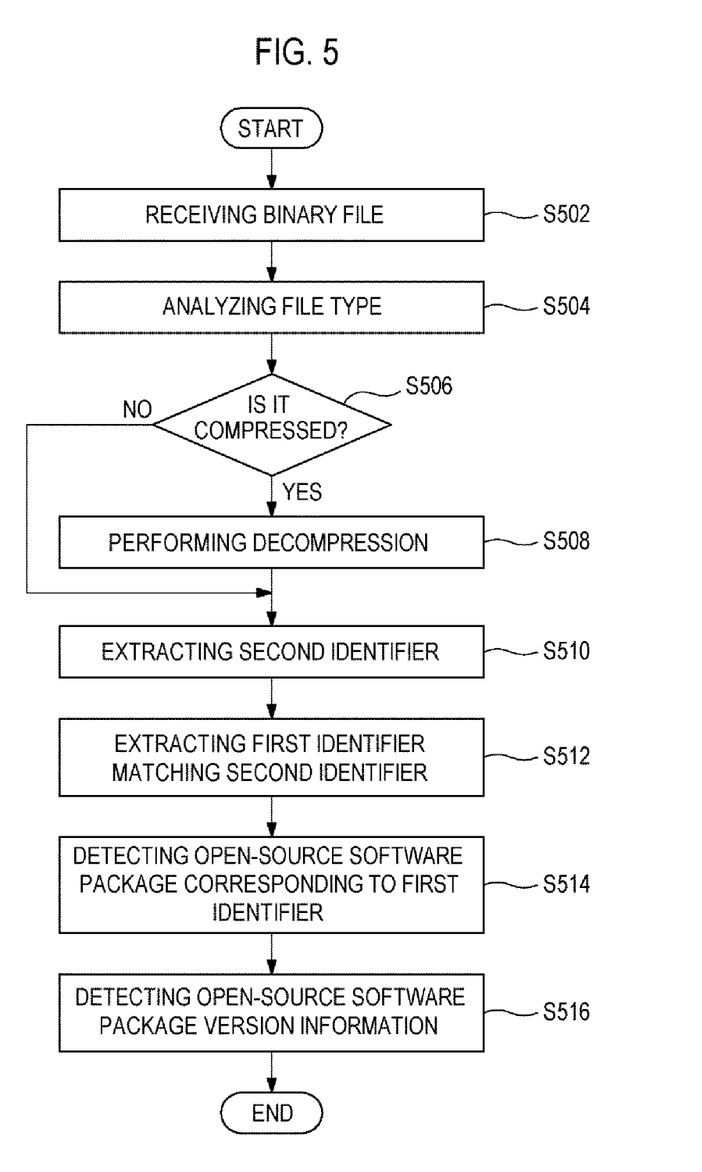
FIG. 5 is a flowchart illustrating a method of detecting an open-source software package and open-source software package version information corresponding to a binary file according to an embodiment of the present disclosure.

FIG. 5 is a flowchart illustrating a method of detecting an open-source software package and open-source software package version information corresponding to a binary file according to an embodiment of the present disclosure. Although process steps, method steps, algorithms, etc. are illustrated in a sequential order in the flowchart shown in FIG. 5, such processes, methods, and algorithms may be configured to be operated in any suitable order. In other words, the steps in the processes, methods, and algorithms explained in various embodiments of the present disclosure are not necessarily performed in the order described in the present disclosure. Further, even though some steps are explained as being performed non-simultaneously, such steps may be simultaneously performed in another embodiment. Moreover, the illustration of the processes depicted in the figure does not mean that the illustrated processes exclude other changes and modifications thereto, that any of the illustrated processes or the steps thereof is essential for at least one of various embodiments of the present disclosure, and that the illustrated processes are desirable.

Referring to FIG. 5, in step S502, a binary file is received. The binary file is a file for which an open-source license is to be checked. For example, the processor 130 receives the binary file from an external server or an external storage medium through the reception unit 120.

In step S504, the file type of the binary file is analyzed. In step S506, it is determined whether the binary file is a compressed file or not. For example, the processor 130 analyzes the file type of the binary file. Further, the processor 130 determines whether the binary file is a compressed file or not.

If it is determined that the binary file is a compressed file in step S506, decompression processing is performed on the binary file in step S508. For example, the processor 130 performs the decompression processing on the binary file according to a compression type (e.g., zip, rar, etc.) of the binary file.

In step S510, at least one second identifier is extracted from the binary file. For example, the processor 130 extracts the at least one second identifier included in the binary file, by performing a string search on the binary file. The string search method performed by the processor 130 can use a suitable string algorithm capable of searching for a specific string or a specific pattern from a file. The file may include general source code, or code of a type different from the source code. For example, the string search method can use any one of well-known string search algorithms such as a native string search algorithm, a finite-state automaton based search algorithm, a Knuth-Morris-Pratt (KMP) algorithm, a Rabin-Karp string search algorithm, and the like. However, it may not be limited thereto.

In step S512, at least one first identifier that matches the at least one second identifier is extracted from the database. For example, the processor 130 extracts, from the database stored in the storage unit 110, the at least one first identifier that matches the at least one second identifier.

In step S514, an open-source software package corresponding to the at least one first identifier is detected. For example, the processor 130 detects the open-source software package corresponding to the at least one first identifier from the database stored in the storage unit 110.

In an embodiment, the processor 130 extracts, from the database stored in the storage unit 110, at least one open-source software package name and at least one open-source file name which correspond to the at least one first identifier.

Figure 6A:
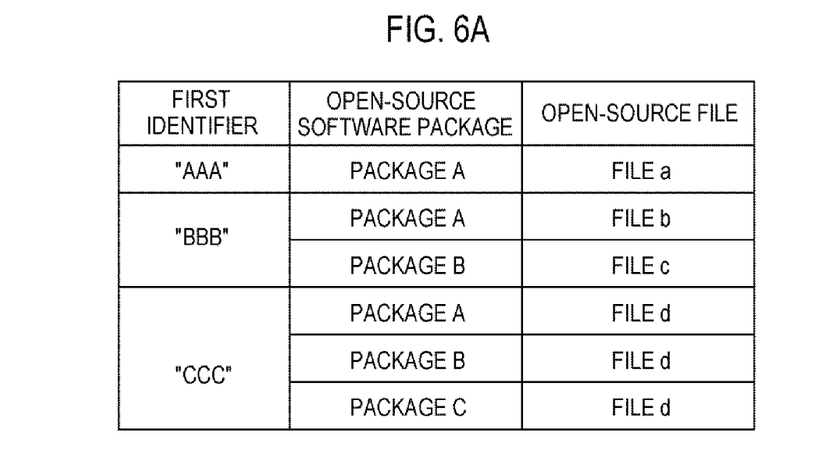
FIG. 6A illustrates first identifiers matching second identifiers included in binary files, and open-source software package names and open-source file names corresponding to the first identifiers according to an embodiment of the present disclosure.

For example, as shown in FIG. 6A, when the first identifiers that match the second identifiers included in the binary file are "AAA," "BBB" and "CCC," the processor 130 extracts the open-source software package name "package A" and the open-source file name "file a," from the database (for example, the first database) stored in the storage unit 110. The open-source software package name "package A" is an open-source software package name corresponding to the first identifier "AAA," and the open-source file name "file a" is an open-source file name corresponding to the open-source software package name "package A." In addition, the processor 130 extracts the open-source software package names "package A" and "package B," the open-source file name "file b," and the open-source file name "file c," from the database (for example, the first database) stored in the storage unit 110. The open-source software package names "package A" and "package B" are open-source software package names corresponding to the first identifier "BBB." The open-source file name "file b" is an open-source file name corresponding to the open-source software package name "package A." The open-source file name "file c" is an open-source file name corresponding to the open-source software package name "package B." Further, the processor 130 extracts: the open-source software package names "package A," "package B" and "package C" corresponding to the first identifier "CCC"; the open-source file name "file d" corresponding to the open-source software package name "package A"; the open-source file name "file d" corresponding to the open-source software package name "package B"; and the open-source file name "file d" corresponding to the open-source software package name "package C," from the database (for example, the first database) stored in the storage unit 110.

In an embodiment, the processor 130 determines whether the first identifier matching the reference first identifier exists among the at least one first identifier detected by the identifier detection unit 330, based on the database stored in the storage unit 110. If it is determined that the first identifier matching the reference first identifier exists, the processor 130 may detect the open-source software package name corresponding to the matched first identifier as an original open-source software package name. Further, the processor 130 may treat (replace) the detected original open-source software package name as the reference open-source software package name.

In an embodiment, the processor 130 determines whether an open-source software package name corresponding to any one first identifier (hereinafter, referred to as "previous first identifier") among a plurality of first identifiers that match the second identifier is uniquely detected or not. If it is determined that a unique open-source software package name corresponding to the previous first identifier is detected, the processor 130 detects at least one open-source software package name corresponding to a first identifier (hereinafter, referred to as "current first identifier") continuous to (that is, immediately after) the previous first identifier. The processor 130 detects an open-source software package name that matches the open-source software package name corresponding to the previous first identifier, among the at least one open-source software package name corresponding to the current first identifier. Further, the processor 130 detects the matched open-source software package name as the unique open-source software package name corresponding to the first identifier.

In an embodiment, the processor 130 assigns a weight to the at least one open-source software package name, based on the at least one open-source software package name and the at least one open-source file name.

Figure 6B:
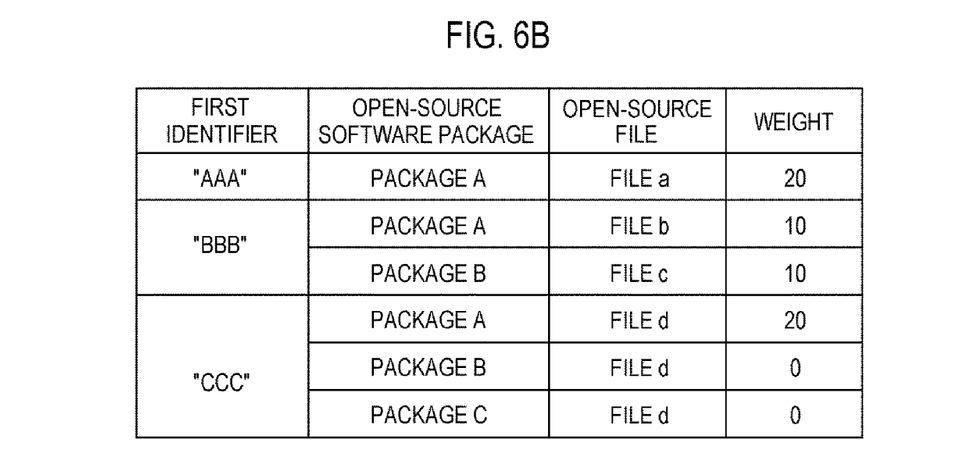
FIG. 6B illustrates an example in which a weight is assigned to an open-source software package name according to an embodiment of the present disclosure.

For example, as shown in FIG. 6A, when an open-source software package name corresponding to the first identifier "AAA" is "package A" and an open-source file name corresponding to the open-source software package name "package A" is "file a," the processor 130 may determine that the open-source software package name corresponding to the first identifier "AAA" is a unique open-source software package name. In this case, as shown in FIG. 6B, the processor 130 assigns a first weight (for example, 20) to the open-source software package name "package A" corresponding to the first identifier "AAA." In an embodiment, the first weight may be calculated based on the string length of the first identifier. However, it may not be limited thereto. Here, the first weight, which is assigned when the unique open-source software package name is detected, is set to have a higher priority than other weights.

In addition, as shown in FIG. 6A, when open-source software package names corresponding to the first identifier "BBB" are "package A" and "package B," an open-source file name corresponding to the open-source software package name "package A" is "file b," and an open-source file name corresponding to the open-source software package name "package B" is "file c," the processor 130 determines that the number of open-source software package names corresponding to the first identifier "BBB" is at least two. Further, the processor 130 determines that the open-source file name is included in one open-source software package name. Therefore, the processor 130 assigns a second weight to the open-source software package names. That is, the processor 130 determines that the open-source file name "file b" is included in the open-source software package name "package A." Further, the processor 130 determines that the open-source file name "file c" is included in the open-source software package name "package B." Therefore, the processor 130 assigns the second weight (for example, 10) to each of the open-source software package names "package A" and "package B," as shown in FIG. 6B. In an embodiment, the second weight is always smaller than the first weight.

Here, when the first identifiers are consecutively shown in the order of "AAA" and "BBB," that is, when the previous first identifier is "AAA" and the current first identifier is "BBB," an open-source software package name corresponding to the previous first identifier "AAA" is "package A" and the unique open-source software package name. Thus, the processor 130 designates the open-source software package name "package A" as the unique open-source software package name. For example, the processor 130 assigns the first weight to the open-source software package name "package A." Since the open-source software package names corresponding to the current first identifier "BBB" are "package A" and "package B" and the open-source software package name commonly corresponding to the previous and current first identifiers among "package A" and "package B" is the open-source software package name "package A," the processor 130 assigns the first weight to the open-source software package name "package A."

Further, as shown in FIG. 6A, when open-source software package names corresponding to the first identifier "CCC" are "package A," "package B" and "package C," an open-source file name corresponding to the open-source software package name "package A" is "file d," an open-source file name corresponding to the open-source software package name "package B" is "file d," and an open-source file name corresponding to the open-source software package name "package C" is "file d," the processor 130 determines that the same open-source file is included in a plurality of open-source software packages. Therefore, the processor 130 later assigns a third weight to the open-source software package name having the highest weight. For example, the processor 130 determines that the open-source file name "file d" is included in the "package A." The processor 130 assigns the third weight (for example, 20) to the open-source software package name "package A" as shown in FIG. 6B. In an embodiment, the third weight may be the same value as the first weight, or may be a value smaller than the first weight.

In an embodiment, among the at least one open-source software package name to which weights are assigned, the processor 130 detects an open-source software package name having the highest weight as the open-source software package name corresponding to the binary file. For example, as shown in FIG. 6B, the processor 130 detects the open-source software package name "package A" having the highest weight (for example, 50) among the open-source software package names "package A," "package B" and "package C" as the open-source software package name corresponding to the binary file.

Referring again to FIG. 5, in step S516, open-source software package version information corresponding to the open-source software package name is detected. For example, the processor 130 detects open-source software package version information corresponding to the binary file, among a plurality of pieces of open-source software package version information corresponding to the open-source software package name.

In an embodiment, the processor 130 extracts, from the database stored in the storage unit 110, at least one piece of open-source software package version information corresponding to the open-source software package name, as well as a checksum of at least one open-source file corresponding to the at least one open-source file name for the at least one first identifier.

Figure 7:
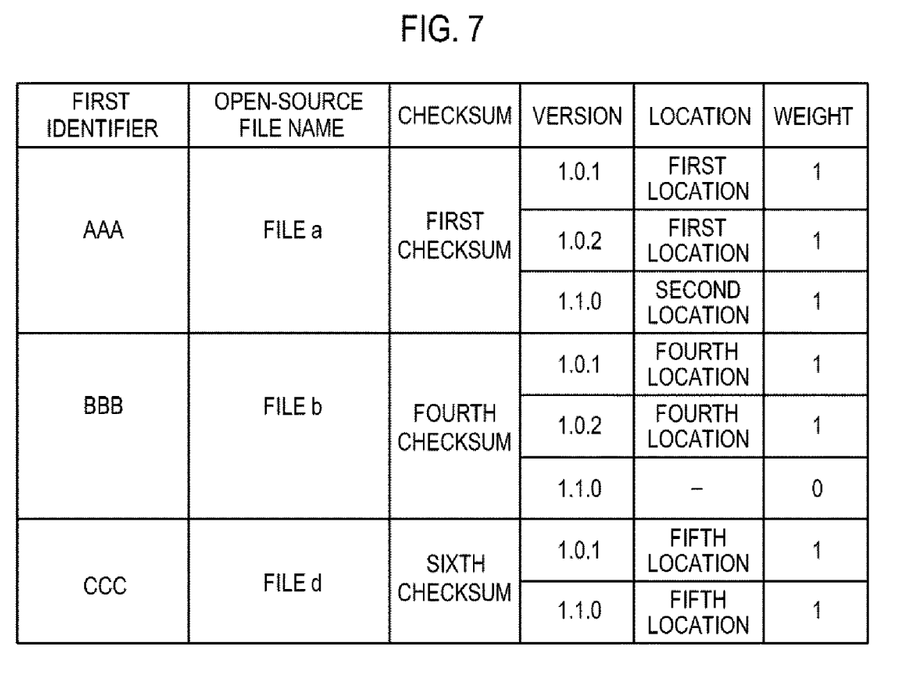
FIG. 7 illustrates an example in which a weight is assigned to open-source software package version information according to an embodiment of the present disclosure.

For example, as shown in FIG. 7, the processor 130 extracts an open-source file checksum "first checksum" corresponding to the open-source file name "file a" which is included in the open-source software package name "package A" for the first identifier "AAA," from the database (for example, the second database) stored in the storage unit 110. In addition, the processor 130 extracts open-source software package version information "1.0.1," "1.0.2" and "1.1.0" corresponding to the open-source file checksum "first checksum."

Further, the processor 130 extracts an open-source file checksum "fourth checksum" corresponding to the open-source file name "file b" which is included in the open-source software package name "package A" for the first identifier "BBB," from the database (for example, the second database) stored in the storage unit 110. The processor 130 extracts open-source software package version information "1.0.1," "1.0.2" and "1.1.0" corresponding to the open-source file checksum "fourth checksum."

Additionally, the processor 130 extracts an open-source file checksum "sixth checksum" corresponding to the open-source file name "file d" which is included in the open-source software package name "package A" for the first identifier "CCC," from the database (for example, the second database) stored in the storage unit 110. The processor 130 extracts open-source software package version information "1.0.1" and "1.1.0" corresponding to the open-source file checksum "sixth checksum."

In an embodiment, the processor 130 detects the open-source software package version information corresponding to the detected open-source software package name, based on the at least one first identifier and the at least one open-source file checksum. In some embodiments, the processor 130 determines whether location information corresponding to at least one first identifier for at least one open-source file checksum exists in the database stored in the storage unit 110. If it is determined that the location information corresponding to the at least one first identifier exists, the processor 130 assigns a predetermined weight to the open-source software package version information corresponding to the at least one open-source file checksum. In addition, the processor 130 detects, among a plurality of pieces of open-source software package version information, the open-source software package version information having the highest weight as the open-source software package version information corresponding to the detected open-source software package name.

For example, the processor 130 determines whether location information corresponding to the first identifier "AAA" for the open-source file checksum "first checksum" exists in the database (for example, the third database) stored in the storage unit 110. The processor 130 determines that the location information ("first location" and "second location") corresponding to the first identifier "AAA" exists in the open-source software package version information "1.0.1," "1.0.2" and "1.1.0" for the open-source file checksum "first checksum." Therefore, the processor 130 assigns a predetermined weight (for example, 1) to each of the open-source software package version information "1.0.1," "1.0.2" and "1.1.0."

The processor 130 assigns predetermined weights to the open-source software package version information for each of the open-source file checksums "fourth checksum" and "sixth checksum" as described above. The processor 130 detects, among the open-source software package version information "1.0.1," "1.0.2" and "1.1.0," the open-source software package version information "1.0.1" having the highest weight as the open-source software package version information corresponding to the detected open-source software package name. That is, the processor 130 detects the open-source software package version information "1.0.1"

having the highest weight as the open-source software package version information corresponding to the binary file.

Additionally or alternatively, the processor 130 may extract, from the database stored in the storage unit 110, open-source license information corresponding to the open-source software package name and the open-source software package version information. Further, the processor 130 may output the extracted open-source license information through the output unit 140.

While the foregoing methods have been described with respect to particular embodiments, these methods may also be implemented as computer-readable code on a computer-readable recording medium. The computer-readable recoding medium includes any kind of data storage devices that can be read by a computer system. Examples of the computer-readable recording medium include ROM, RAM, CD-ROM, magnetic tape, floppy disk, optical data storage device and the like, and also include a medium implemented in the form of a carrier wave (e.g., transmission via Internet). Also, the computer-readable recoding medium can be distributed to computer systems connected through a network so that the computer-readable code can be stored and executed in a distributed manner. Further, functional programs, code and code segments for implementing the foregoing embodiments can easily be inferred by programmers in the art to which the present disclosure pertains.

Although the technical spirit of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications and changes are intended to fall within the scope of the appended claims.

What is claimed is:

1. A method for identifying an open-source software package from a binary file for which an open-source license is to be checked, the method comprising:
   accessing a database generated to include a plurality of open-source software packages having a plurality of open-source files, a plurality of open-source software package names, a plurality of open-source file names, and open-source software package version information, based on a plurality of first identifiers included in each of the plurality of open-source files;
   receiving the binary file;
   extracting at least one second identifier included in the binary file by performing a string search on the binary file; and
   extracting at least one first identifier that matches the at least one second identifier from the database, and outputting an open-source software package and open-source software package version information corresponding to the at least one first identifier,
   wherein the extracting of the at least one second identifier included in the binary file includes:
   extracting at least one open-source software package name and at least one open-source file name corresponding to the at least one first identifier, from the plurality of open-source software package names and the plurality of open-source file names;
   assigning a weight to the at least one open-source software package name, based on the at least one open-source software package name and the at least one open-source file name; and
   detecting an open-source software package name having the highest weight from the at least one open-source software package name to which the weight is assigned.

2. The method of claim 1, wherein each of the first identifier and the second identifier comprises a string that is preserved even after the open-source files are compiled.

3. The method of claim 2, wherein accessing the database comprises:
   downloading the plurality of open-source software packages from an open-source providing server;
   extracting open-source information from the plurality of open-source software packages; and
   generating the database based on the open-source information.

4. The method of claim 3, wherein the open-source information comprises the plurality of first identifiers, an open-source software package name, open-source software package version information, and an open-source file name.

5. The method of claim 4, wherein the database comprises:
   a first database storing a first table, the first table including the first identifiers corresponding to each of the plurality of open-source software packages, the open-source software package names, and the open-source file names in which the first identifiers exist;
   a second database storing a second table, the second table including the open-source software package names corresponding to the plurality of open-source files, the open-source software package version information, the open-source file names, and open-source file checksums; and
   a third database storing a third table, the third table including the open-source file checksums corresponding to the first identifiers and location information of the first identifiers in the open-source files.

6. The method of claim 5, wherein extracting the at least one second identifier included in the binary file comprises:
   identifying a file type of the binary file; and
   extracting the at least one second identifier from the binary file according to the file type.

7. The method of claim 5, wherein the database further comprises a reference open-source software package name of a reference open-source software package designated by a manager among the plurality of open-source software packages, and a reference first identifier that is identically included in the reference open-source software package of a plurality of pieces of open-source software package version information.

8. The method of claim 7, wherein extracting the at least one open-source software package name and the at least one open-source file name corresponding to the at least one first identifier comprises detecting an open-source software package name that matches the reference open-source software package name among the extracted at least one open-source software package name based on the reference first identifier.

9. The method of claim 8, wherein detecting the open-source software package name that matches the reference open-source software package name comprises:
   identifying a first identifier that matches the reference first identifier among the at least one first identifier; and
   treating an open-source software package name corresponding to the matched first identifier as the reference open-source software package name.

10. The method of claim 1, wherein extracting the at least one open-source software package name and the at least one open-source file name corresponding to the at least one first identifier comprises:

extracting two consecutive first identifiers in an order in which the at least one first identifier is identified;

determining whether an open-source software package name corresponding to the initially identified first identifier among the two consecutive first identifiers is a unique open-source software package name;

if the open-source software package name corresponding to the initially identified first identifier is determined to be the unique open-source software package name, determining whether an open-source software package name that matches the unique open-source software package name exists among the open-source software package names corresponding to the finally identified first identifier among the two consecutive first identifiers; and if the open-source software package name matching the unique open-source software package name is determined to exist, replacing the matched open-source software package name with the unique open-source software package name.

11. The method of claim 5, wherein outputting the open-source software package and the open-source software package version information corresponding to the at least one first identifier comprises:

extracting, from the second database, at least one open-source file checksum corresponding to at least one open-source file name included in the detected open-source software package name, and at least one piece of open-source software package version information corresponding to the at least one open-source file checksum; and detecting open-source software package version information corresponding to the detected open-source software package name based on the at least one first identifier and the at least one open-source file checksum.

12. The method of claim 11, wherein detecting the open-source software package version information corresponding to the detected open-source software package name based on the at least one first identifier and the at least one open-source file checksum comprises:

determining whether location information corresponding to the at least one first identifier for the at least one open-source file checksum exists in the third database;

if the location information corresponding to the at least one first identifier is determined to exist, assigning a predetermined weight to open-source software package version information corresponding to the at least one open-source file checksum; and detecting open-source software package version information having the highest weight among the open-source software package version information as open-source software package version information corresponding to the detected open-source software package name.

13. A system for identifying an open-source software package from a binary file for which an open-source license is to be checked, the system comprising:

a storage unit storing a database generated to include a plurality of open-source software packages having a plurality of open-source files, a plurality of open-source software package names, a plurality of open-source file names, and open-source software package version information, based on a plurality of first identifiers included in each of the plurality of open-source files;

a receiver configured to receive the binary file;

a processor configured to extract at least one second identifier included in the binary file by performing a string search on the binary file, to extract at least one first identifier that matches the at least one second identifier from the database, and to detect an open-source software package and open-source software package version information corresponding to the at least one first identifier; and an output device configured to output the detected open-source software package and open-source software package version information, wherein the processor is configured to:

extract at least one open-source software package name and at least one open-source file name corresponding to the at least one first identifier, from the plurality of open-source software package names and the plurality of open-source file names;

assign a weight to the at least one open-source software package name, based on the at least one open-source software package name and the at least one open-source file name; and detect an open-source software package name having the highest weight from the at least one open-source software package name to which the weight is assigned.

14. The system of claim 13, wherein each of the first identifier and the second identifier comprises a string that is preserved even after the open-source file is compiled.

15. The system of claim 13, wherein the processor is configured to:

download the plurality of open-source software packages from an open-source providing server through the receiver;

extract open-source information from the plurality of open-source software packages; and generate the database based on the open-source information.

16. The system of claim 15, wherein the open-source information comprises the plurality of first identifiers, an open-source software package name, open-source software package version information, and an open-source file name.

17. The system of claim 16, wherein the database comprises:

a first database storing a first table, the first table including the first identifiers corresponding to each of the plurality of open-source software packages, the open-source software package names, and the open-source file names in which the first identifiers exist;

a second database storing a second table, the second table including the open-source software package names corresponding to the plurality of open-source files, the open-source software package version information, the open-source file names, and open-source file checksums; and a third database storing a third table, the third table including the open-source file checksums corresponding to the first identifiers and location information of the first identifiers in the open-source files.

18. The system of claim 17, wherein the processor is configured to:

identify a file type of the binary file; and extract the at least one second identifier from the binary file according to the file type.

19. The system of claim 17, wherein the database further comprises a reference open-source software package name of a reference open-source software package designated by a manager among the plurality of open-source software packages, and a reference first identifier that is identically included in the reference open-source software package of the plurality of pieces of open-source software package version information.

20. The system of claim 19, wherein the processor is configured to detect an open-source software package name that matches the reference open-source software package name among the extracted at least one open-source software package name based on the reference first identifier.

21. The system of claim 20, wherein the processor is configured to:
identify a first identifier that matches the reference first identifier among the at least one first identifier; and
treat an open-source software package name corresponding to the matched first identifier as the reference open-source software package name.

22. The system of claim 13, wherein the processor is configured to:
extract two consecutive first identifiers in an order in which the at least one first identifier is identified;
determine whether an open-source software package name corresponding to the initially identified first identifier among the two consecutive first identifiers is a unique open-source software package name or not;
if the open-source software package name corresponding to the initially identified first identifier is determined to be the unique open-source software package name, determine whether an open-source software package name that matches the unique open-source software package name exists among the open-source software package names corresponding to the finally identified first identifier among the two consecutive first identifiers; and
if the open-source software package name matching the unique open-source software package name is determined to exist, replace the matched open-source software package name with the unique open-source software package name.

23. The system of claim 17, wherein the processor is configured to:
extract, from the second database, at least one open-source file checksum corresponding to at least one open-source file name included in the detected open-source software package name, and at least one piece of open-source software package version information corresponding to the at least one open-source file checksum; and
detect open-source software package version information corresponding to the detected open-source software package name based on the at least one first identifier and the at least one open-source file checksum.

24. The system of claim 23, wherein the processor is configured to:
determine whether location information corresponding to the at least one first identifier for the at least one open-source file checksum exists in the third database;
if the location information corresponding to the at least one first identifier is determined to exist, assign a predetermined weight to open-source software package version information corresponding to the at least one open-source file checksum; and
detect open-source software package version information having the highest weight among the open-source software package version information as open-source software package version information corresponding to the detected open-source software package name.

* * * * *